US010219630B1

(12) United States Patent
Odgaard et al.

(10) Patent No.: US 10,219,630 B1
(45) Date of Patent: Mar. 5, 2019

(54) END TABLE

(71) Applicants: Lars Odgaard, Indianapolis, IN (US);
Debbie Turner, Indianapolis, IN (US)

(72) Inventors: Lars Odgaard, Indianapolis, IN (US);
Debbie Turner, Indianapolis, IN (US)

(*) Notice: Subject to any disclaimer, the term of this patent is extended or adjusted under 35 U.S.C. 154(b) by 0 days.

(21) Appl. No.: 15/725,056

(22) Filed: Oct. 4, 2017

(51) Int. Cl.
A47C 7/68 (2006.01)
A47C 7/70 (2006.01)
F16B 2/12 (2006.01)
A47B 13/16 (2006.01)

(52) U.S. Cl.
CPC .............. A47C 7/70 (2013.01); A47B 13/16 (2013.01); F16B 2/12 (2013.01)

(58) Field of Classification Search
CPC .. A47C 7/68; A47C 7/70; A47B 13/16; F16B 2/12
USPC ........ 108/42, 46, 47, 49; 297/145, 135, 155, 297/188.18; 248/231.41, 240.4
See application file for complete search history.

(56) References Cited

U.S. PATENT DOCUMENTS

| 1,453,186 | A | * | 4/1923 | Ruffin, Jr. | A47B 31/06 108/11 |
| 2,558,366 | A | * | 6/1951 | Madlena | A47B 23/02 108/47 |
| 2,797,973 | A | * | 7/1957 | Culpepper | A47C 7/68 108/157.11 |
| 2,867,401 | A | * | 1/1959 | Sheahan | A47C 7/68 108/47 |
| 3,185,113 | A | * | 5/1965 | Nathan | A47G 23/06 108/47 |
| 3,186,673 | A | * | 6/1965 | Olson | A47B 31/06 211/86.01 |
| 3,522,887 | A | * | 8/1970 | Petersen | A63B 71/0009 108/44 |
| 3,625,162 | A | * | 12/1971 | Crew | A47J 36/34 108/47 |
| D282,042 | S | * | 1/1986 | Gallagher | D7/554.3 |
| 4,575,149 | A | | 3/1986 | Forestad | |
| 4,628,552 | A | | 12/1986 | Magistretti | |
| 5,909,922 | A | | 6/1999 | Dugas | |
| 6,027,165 | A | | 2/2000 | Adkins | |

(Continued)

FOREIGN PATENT DOCUMENTS

WO WO2007046827 4/2007

OTHER PUBLICATIONS

Rustic Wooden Square serving tray web page; Amazon.com; prior to Oct. 4, 2017 (Year: 2017).*

Primary Examiner — Janet M Wilkens

(57) ABSTRACT

An end table for attaching to an armrest includes a plate that is rigid. A pair of arms is coupled longitudinally to and extends perpendicularly from a bottom of the plate. The arms are both parallel to opposing sides of the plate and define a gap between the arms. At least one of the arms is slidably positionable relative to the opposing sides so that the gap is selectively sizable. The gap is configured to insert an armrest of a piece of furniture, such as a chair and a couch. The arms are configured to frictionally couple to opposing faces of the armrest to couple the plate to the armrest. The plate is configured to position articles, such as a drink container and a snack container, on a top of the plate proximate to a user who is seated on the piece of furniture.

10 Claims, 4 Drawing Sheets

(56) References Cited

U.S. PATENT DOCUMENTS

| | | | | |
|---|---|---|---|---|
| 6,082,270 A | * | 7/2000 | Zerger | B60N 3/001 |
| | | | | 108/42 |
| 6,935,683 B1 | * | 8/2005 | Brown | A47C 7/70 |
| | | | | 297/153 |
| 7,121,213 B2 | * | 10/2006 | Viazanko | A47B 5/02 |
| | | | | 108/42 |
| 7,131,688 B2 | | 11/2006 | Steenson | |
| 7,533,618 B2 | * | 5/2009 | Thomason | A47B 7/00 |
| | | | | 108/42 |
| D749,869 S | | 2/2016 | Wenji et al. | |
| 9,474,379 B1 | * | 10/2016 | Villasuso | A47C 7/68 |
| 2008/0251413 A1 | * | 10/2008 | Blumenau-Bebry | |
| | | | | A47G 1/0605 |
| | | | | 206/562 |
| 2016/0000222 A1 | | 1/2016 | Calderone | |

* cited by examiner

END TABLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to end tables and more particularly pertains to a new end table for attaching to an armrest.

BRIEF SUMMARY OF THE INVENTION

An embodiment of the disclosure meets the needs presented above by generally comprising a plate that is rigid. A pair of arms is coupled longitudinally to and extends perpendicularly from a bottom of the plate. The arms are both parallel to opposing sides of the plate and define a gap between the arms. At least one of the arms is slidably positionable relative to the opposing sides so that the gap is selectively sizable. The gap is configured to insert an armrest of a piece of furniture, such as a chair and a couch. The arms are configured to frictionally couple to opposing faces of the armrest to couple the plate to the armrest. The plate is configured to position articles, such as a drink container and a snack container, on a top of the plate proximate to a user who is seated on the piece of furniture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
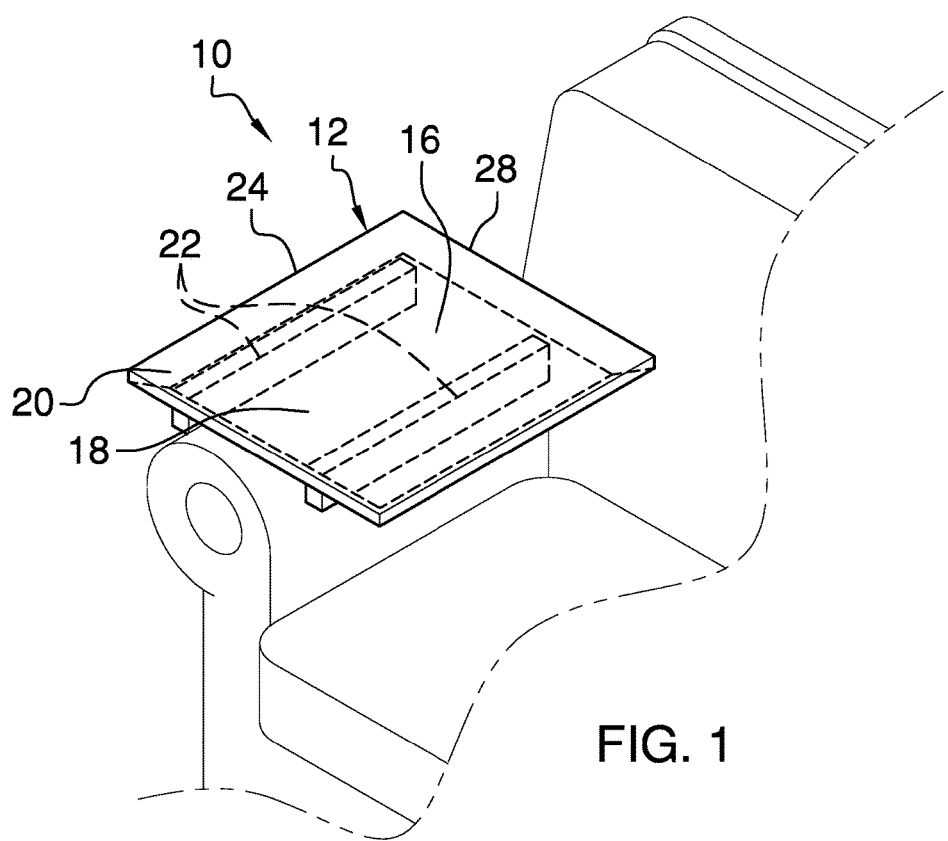
FIG. 1 is an isometric perspective view of an end table according to an embodiment of the disclosure.
Figure 2:
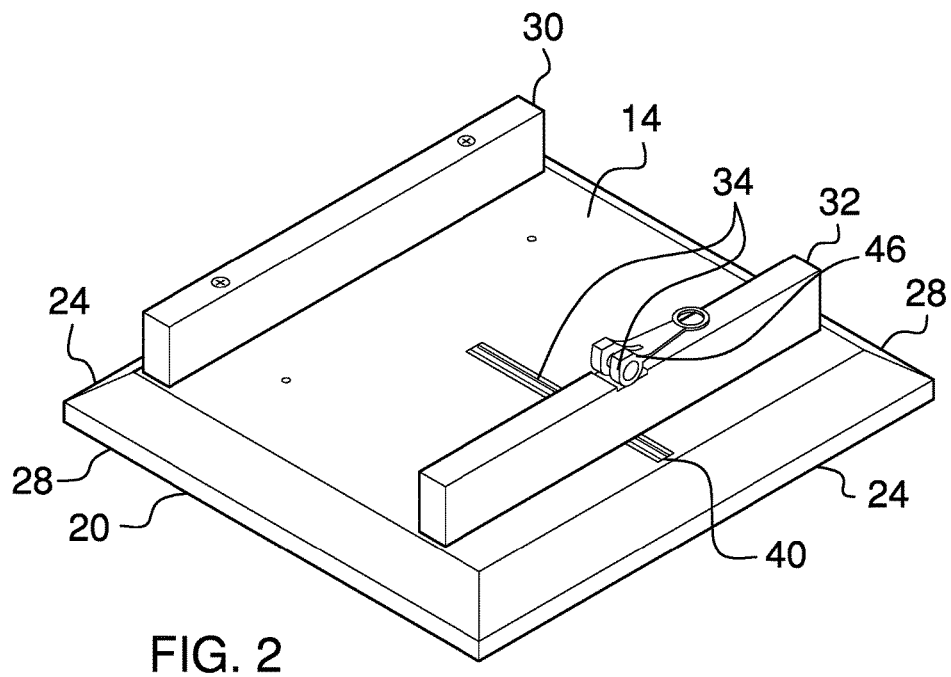
FIG. 2 is an isometric perspective view of an embodiment of the disclosure.
Figure 3:
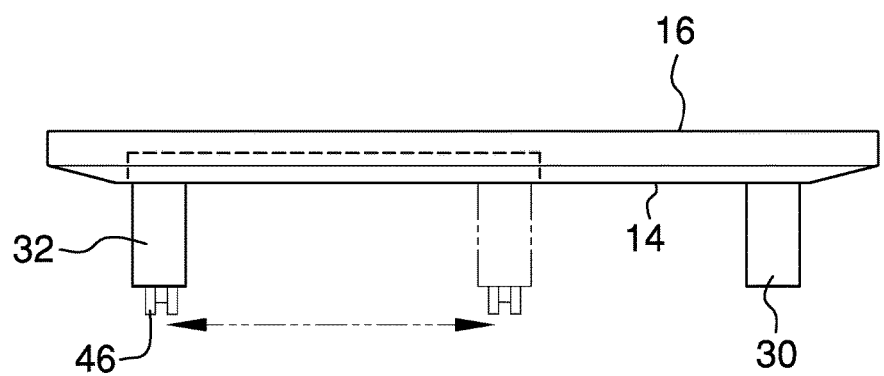
FIG. 3 is an end view of an embodiment of the disclosure.
Figure 4:
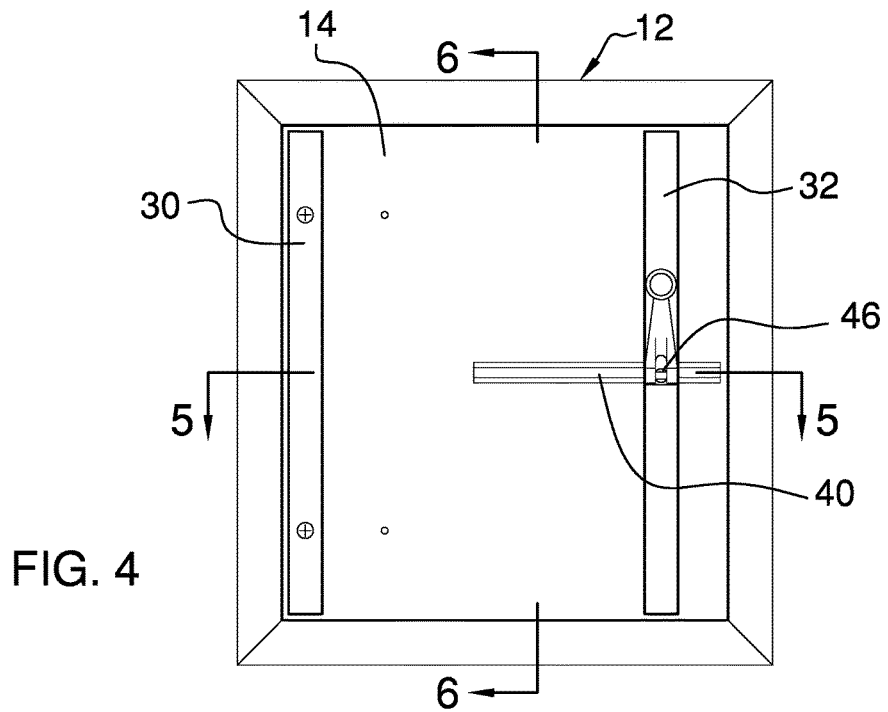
FIG. 4 is a bottom view of an embodiment of the disclosure.
Figure 5:
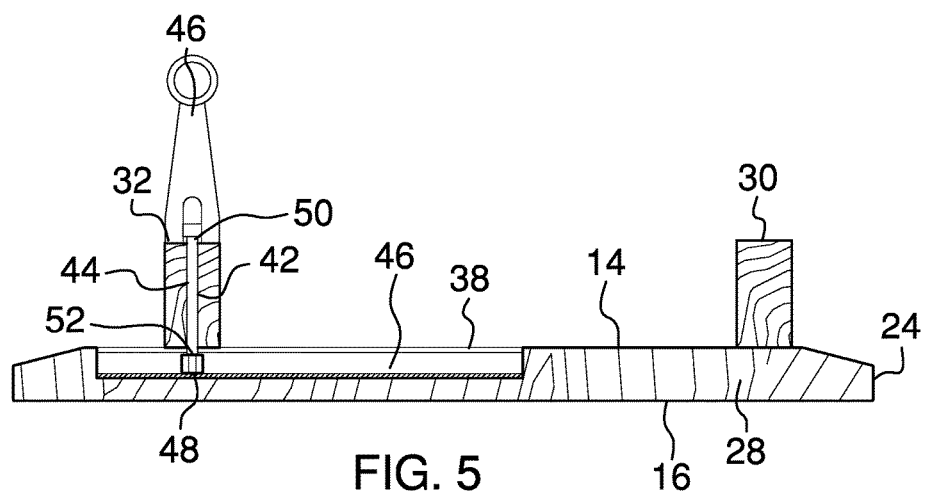
FIG. 5 is a cross-sectional view of an embodiment of the disclosure.
Figure 6:
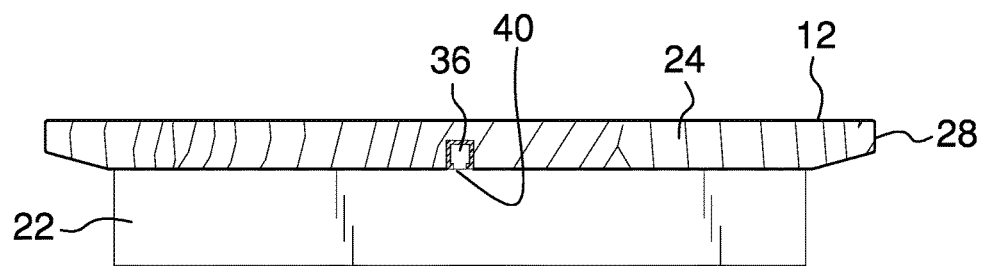
FIG. 6 is a cross-sectional view of an embodiment of the disclosure.

With reference now to the drawings, and in particular to FIGS. 1 through 6 thereof, a new end table embodying the principles and concepts of an embodiment of the disclosure and generally designated by the reference numeral 10 will be described.

As best illustrated in FIGS. 1 through 6, the end table 10 generally comprises a plate 12 that is rigid. In one embodiment, the plate 12 is rectangularly shaped. In another embodiment, the plate 12 is squarely shaped. In yet another embodiment, the plate 12 comprises wood. In still yet another embodiment, the plate 12 is beveled so that a bottom 14 of the plate 12 is dimensionally smaller than a top 16 of the plate 12.

A recess 18 is positioned in the top 16 of the plate 12 and defines a rim 20. The recess 18 is configured to selectively insert articles, such as a drink container and a snack container, to retain the articles on the plate 12.

A pair of arms 22 is coupled longitudinally to and extends perpendicularly from the bottom 14 of the plate 12. The arms 22 are both parallel to opposing sides 24 of the plate 12 and define a gap 26 between the arms 22. At least one of the arms 22 is slidably positionable relative to the opposing sides 24 so that the gap 26 is selectively sizable. The gap 26 is configured to insert an armrest of a piece of furniture, such as a chair and a couch. The arms 22 are configured to frictionally couple to opposing faces of the armrest to couple the plate 12 to the armrest. The plate 12 is configured to position the articles, such as the drink container and the snack container, on the top 16 of the plate 12 proximate to a user who is seated on the piece of furniture. In one embodiment, the arms 22 comprise wood. In another embodiment, the arms 22 extend from proximate to opposing ends 28 of the plate 12.

In yet another embodiment, the pair of arms 22 comprise a first slat 30 and a second slat 32. The first slat 30 is fixedly coupled to the bottom 14 proximate to a respective opposing side 24 of the plate 12. The second slat 32 that slidably coupled to the bottom 14. The second slat 32 is selectively positionable relative to the first slat 30. The gap 26 is configured to insert the armrest of the piece of furniture, such as the chair and the couch. The second slat 32 is selectively positionable relative to the first slat 30 so that the first slat 30 and the second slat 32 are configured to frictionally couple to the opposing faces of the armrest to couple the plate 12 to the armrest.

A coupler 34 is coupled to the second slat 32. The coupler 34 is configured to selectively couple to the plate 12 to fixedly position the second slat 32 relative to the first slat 30. The coupler 34 is positioned to couple to the plate 12 so that the first slat 30 and the second slat 32 are frictionally coupled to the opposing faces of the armrest to couple the plate 12 to the armrest.

In one embodiment, the coupler 34 comprises a plurality of channels 36 that is positioned in the plate 12. Each channel 36 extends perpendicularly from the respective opposing side 24 to proximate to a midline 38 of the plate 12. In another embodiment, the channels 36 are metal-lined. In yet another embodiment, the plurality of channels 36 comprises one channel 36 that is equally positioned between the opposing ends 28 of the plate 12. A plurality of slots 40 is positioned in the bottom 14 of the plate 12. Each slot 40 extends to an associated channel 36.

The coupler 34 comprises a plurality of penetrations 42 positioned through the second slat 32. Each of a plurality of bolts 44 is positioned through a respective penetration 42 and the associated channel 36. Each bolt 44 has a first end 50 that is pivotally coupled to a latch 46 and second end 52 that is coupled to a catch 48. The catch 48 is positioned in the associated channel 36. The latch 46 of the respective bolt 44 abuts the second slat 32 distal from the plate 12. The latch 46 is configured to be pivoted to a configuration substantially perpendicular to the second slat 32 so that the catch 48 is positioned to slide within the associated channel 36. The second slat 32 is selectively positionable relative to the first slat 30. The latch 46 also is configured to be pivoted to a configuration parallel to the second slat 32 to compel the catch 48 to couple to the plate 12. The second slat 32 is fixedly positioned relative to the first slat 30.

In use, the gap 26 is configured to insert the armrest of the piece of furniture, such as the chair and the couch. The second slat 32 is selectively positionable relative to the first slat 30 so that the first slat 30 and the second slat 32 are configured to frictionally couple to the opposing faces of the armrest. The latch 46 is configured to be pivoted to the configuration substantially perpendicular to the second slat 32 so that the catch 48 is positioned to slide within the associated channel 36. The second slat 32 is selectively positionable relative to the first slat 30. The first slat 30 and the second slat 32 are frictionally coupled to the opposing faces of the armrest to couple the plate 12 to the armrest. The latch 46 also is configured to be pivoted to the configuration parallel to the second slat 32 to compel the catch 48 to couple to the plate 12. The second slat 32 is fixedly positioned relative to the first slat 30 The recess 18 is configured to selectively insert the articles, such as the drink container and the snack container, to retain the articles on the plate 12 and proximate to the user who is seated on the piece of furniture.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An end table comprising:
a plate, said plate being rigid;
a pair of arms coupled longitudinally to and extending perpendicularly from a bottom of said plate, said arms being both being parallel to opposing sides of said plate defining a gap between said arms, at least one of said arms being slidably positionable relative to said opposing sides such that said gap is selectively sizable, said pair of arms comprising
   a first slat fixedly coupled to said bottom proximate to a respective said opposing side of said plate,
   a second slat slidably coupled to said bottom, said second slat being selectively positionable relative to said first slat, and
   wherein said first slat and said second slat are positioned on said plate such that said gap is configured for inserting the armrest of the piece of furniture, wherein said second slat is selectively positionable relative to said first slat such that said first slat and said second slat are configured for frictionally coupling to the opposing faces of the armrest for coupling said plate to the armrest;
wherein said arms are positioned on said plate such that said gap is configured for inserting an armrest of a piece of furniture, wherein said gap is selectively sizable such that said arms are configured for frictionally coupling to opposing faces of the armrest for coupling said plate to the armrest such that said plate is configured for positioning articles on a top of said plate proximate to a user seated on the piece of furniture; and
a coupler coupled to said second slat, said coupler being configured for selectively coupling to said plate for fixedly positioning said second slat relative to said first slat, wherein said coupler is positioned on said second slat such that said coupler is positioned for coupling to said plate such that said first slat and said second slat are frictionally coupled to the opposing faces of the armrest for coupling said plate to the armrest, said coupler comprising
   a channel positioned in said plate, said channel extending perpendicularly from said opposing side to proximate to a midline of said plate;
   a slot positioned in said bottom of said plate, said slot extending to said channel;
   a penetration positioned through said second slat;
   a bolt, said bolt being positioned through said penetration and said channel, said bolt having a first end pivotally coupled to a latch and a second end coupled to a catch, said catch being positioned in said channel, said latch abutting said second slat distal from said plate; and wherein said latch is positioned on said bolt such that said latch is configured for pivoting to a configuration substantially perpendicular to said second slat such that said catch is positioned for sliding within said channel such that said second slat is selectively positionable relative to said first slat, said latch being configured for pivoting to a configuration parallel to said second slat for compelling said catch for coupling to said plate such that said second slat said is fixedly positioned relative to said first slat.

2. The table of claim 1, further including said plate being rectangularly shaped.

3. The table of claim 2, further including said plate being squarely shaped.

4. The table of claim 1, further including said plate and said pair of arms comprising wood.

5. The table of claim 4, further including said plate being beveled such that said bottom of said plate is dimensionally smaller than said top of said plate.

6. The table of claim 1, further including a recess positioned in said top of said plate defining a rim, wherein said recess is positioned in said plate such that said recess is configured for selectively inserting the articles for retaining the articles on said plate.

7. The table of claim 1, further including said arms extending from proximate to opposing ends of said plate.

8. The table of claim 1, further including said channel being metal-lined.

9. The table of claim 1, further including said channel being positioned equidistant between opposing ends of said plate.

10. An end table comprising:
- a plate, said plate being rigid, said plate being rectangularly shaped, said plate being squarely shaped, said plate comprising wood, said plate being beveled such that a bottom of said plate is dimensionally smaller than a top of said plate;
- a recess positioned in said top of said plate defining a rim, wherein said recess is positioned in said plate such that said recess is configured for selectively inserting articles for retaining the articles on said plate;
- a pair of arms coupled longitudinally to and extending perpendicularly from said bottom of said plate, said arms being both being parallel to opposing sides of said plate defining a gap between said arms, at least one of said arms being slidably positionable relative to said opposing sides such that said gap is selectively sizable, wherein said arms are positioned on said plate such that said gap is configured for inserting an armrest of a piece of furniture, wherein said gap is selectively sizable such that said arms are configured for frictionally coupling to opposing faces of the armrest for coupling said plate to the armrest such that said plate is configured for positioning the articles on said top of said plate proximate to a user seated on the piece of furniture, said arms comprising wood, said arms extending from proximate to opposing ends of said plate, said pair of arms comprising:
  - a first slat fixedly coupled to said bottom proximate to a respective said opposing side of said plate,
  - a second slat slidably coupled to said bottom, said second slat being selectively positionable relative to said first slat, and
  - wherein said first slat and said second slat are positioned on said plate such that said gap is configured for inserting the armrest of the piece of furniture, wherein said second slat is selectively positionable relative to said first slat such that said first slat and said second slat are configured for frictionally coupling to the opposing faces of the armrest for coupling said plate to the armrest;
- a coupler coupled to said second slat, said coupler being configured for selectively coupling to said plate for fixedly positioning said second slat relative to said first slat, wherein said coupler is positioned on said second slat such that said coupler is positioned for coupling to said plate such that said first slat and said second slat are frictionally coupled to the opposing faces of the armrest for coupling said plate to the armrest, said coupler comprising:
  - channel positioned in said plate, said channel extending perpendicularly from said opposing side to proximate to a midline of said plate, said channels being metal-lined, said channel being positioned equidistant between said opposing ends of said plate,
  - a slot positioned in said bottom of said plate, said slot extending to said channel,
  - a penetration positioned through said second slat,
  - a bolt, each said bolt being positioned through said penetration and said channel, said bolt having a first end pivotally coupled to a latch and a second end coupled to a catch, said catch being positioned in said channel, said latch abutting said second slat distal from said plate, and
  - wherein said latch is positioned on said bolt such that said latch is configured for pivoting to a configuration substantially perpendicular to said second slat such that said catch is positioned for sliding within said channel such that said second slat is selectively positionable relative to said first slat, said latch being configured for pivoting to a configuration parallel to said second slat for compelling said catch for coupling to said plate such that said second slat is fixedly positioned relative to said first slat; and
- wherein said first slat and said second slat are positioned on said plate such that said gap is configured for inserting the armrest of the piece of furniture, wherein said second slat is selectively positionable relative to said first slat such that such that said first slat and said second slat are configured for frictionally coupling to the opposing faces of the armrest, wherein said latch is positioned on said bolt such that said latch is configured for pivoting to the configuration substantially perpendicular to said second slat such that said catch is positioned for sliding within said associated said channel such that said second slat is selectively positionable relative to said first slat, said latch being configured for pivoting to the configuration parallel to said second slat for compelling said catch for coupling to said plate such that said second slat is fixedly positioned relative to said first slat, wherein said recess is positioned in said plate such that said recess is configured for selectively inserting the articles for retaining the articles on said plate and proximate to the user seated on the piece of furniture.

* * * * *